US012600085B2

(12) United States Patent
Bendjus et al.

(10) Patent No.: US 12,600,085 B2
(45) Date of Patent: Apr. 14, 2026

(54) SYSTEM AND METHOD FOR MONITORING MANUFACTURING PRECISION IN THE ADDITIVE MANUFACTURING OF THREE-DIMENSIONAL COMPONENTS

(71) Applicant: FRAUNHOFER-GESELLSCHAFT ZUR FOERDERUNG DER ANGEWANDTEN FORSCHUNG E.V., Munich (DE)

(72) Inventors: Beatrice Bendjus, Dresden (DE); Ulana Cikalova, Radeburg (DE); Mike Roellig, Radeburg (DE)

(73) Assignee: Fraunhofer-Gellschaft Zur Foerderung Der Angewandten Forschung E.V., Munich (DE)

( * ) Notice: Subject to any disclaimer, the term of this patent is extended or adjusted under 35 U.S.C. 154(b) by 168 days.

(21) Appl. No.: 16/962,239

(22) PCT Filed: Jan. 11, 2019

(86) PCT No.: PCT/EP2019/050637
§ 371 (c)(1),
(2) Date: Jul. 15, 2020

(87) PCT Pub. No.: WO2019/138038
PCT Pub. Date: Jul. 18, 2019

(65) Prior Publication Data
US 2021/0060855 A1 Mar. 4, 2021

(30) Foreign Application Priority Data
Jan. 15, 2018 (DE) ..................... 10 2018 200 566.4

(51) Int. Cl.
B29C 64/393 (2017.01)
B29C 64/153 (2017.01)
(Continued)

(52) U.S. Cl.
CPC .......... B29C 64/153 (2017.08); B29C 64/214 (2017.08); B29C 64/268 (2017.08);
(Continued)

(58) Field of Classification Search
CPC ......... B29C 64/00; B33Y 10/00; B33Y 50/00; B23K 26/032; B22F 12/00; B22F 10/00; B28B 1/001; B28B 17/00; G01B 11/162
See application file for complete search history.

(56) References Cited

U.S. PATENT DOCUMENTS

| | | | | |
|---|---|---|---|---|
| 5,582,876 A | * | 12/1996 | Langer | ................. G03F 7/0037 |
| | | | | 427/492 |
| 2007/0120337 A1 | | 5/2007 | Gibbs | |

(Continued)

FOREIGN PATENT DOCUMENTS

| | | |
|---|---|---|
| CN | 1146041 | 3/1997 |
| CN | 102439422 | 5/2012 |

(Continued)

OTHER PUBLICATIONS

Japanese Office Action.
(Continued)

*Primary Examiner* — Susan D Leong
*Assistant Examiner* — Tiffany Yu Huang
(74) *Attorney, Agent, or Firm* — Dunlap Bennett & Ludwig PLLC

(57) ABSTRACT

A system for monitoring manufacturing precision in additive manufacturing of three-dimensional components. A combined illuminations and detection element is provided equipped with a two-dimensional detector array and at least one laser radiation source directed onto a region of a material in powder or paste form. Producing at least one region of a three-dimensional component with a locally defined energy input. The detector array is arranged and
(Continued)

designed such that speckle arising in/on the surface irradiated by the laser radiation source can be detected in a spatially resolved manner using the detector array and can be fed to an electronic evaluation and control circuit which is connected to an electronic open- and closed-loop control device designed to influence the system. Thermal speckle excitation is achieved using a separate energy beam with which the energy input takes place locally in a defined manner on the material in powder or pasty form.

7 Claims, 3 Drawing Sheets

(51) Int. Cl.

| | |
|---|---|
| *B29C 64/214* | (2017.01) |
| *B29C 64/268* | (2017.01) |
| *B29C 64/286* | (2017.01) |
| *B33Y 50/02* | (2015.01) |
| *B33Y 10/00* | (2015.01) |
| *B33Y 30/00* | (2015.01) |

(52) U.S. Cl.
CPC .......... *B29C 64/286* (2017.08); *B29C 64/393* (2017.08); *B33Y 50/02* (2014.12); *B33Y 10/00* (2014.12); *B33Y 30/00* (2014.12)

(56) References Cited

U.S. PATENT DOCUMENTS

| | | | |
|---|---|---|---|
| 2013/0168902 A1 | 7/2013 | Herzog et al. | |
| 2014/0265040 A1 | 9/2014 | Batchelder | |
| 2015/0219444 A1* | 8/2015 | Bamberg | G01B 11/162 |
| | | | 264/408 |
| 2016/0320176 A1 | 11/2016 | Yang et al. | |
| 2017/0050254 A1 | 2/2017 | Holverson et al. | |
| 2018/0215102 A1* | 8/2018 | Amaya | B33Y 50/02 |
| 2019/0039302 A1* | 2/2019 | Herzog | B29C 64/227 |
| 2020/0223146 A1* | 7/2020 | Totzeck | G01B 11/0666 |
| 2020/0262152 A1* | 8/2020 | Dardis | B29C 64/153 |
| 2020/0263978 A1* | 8/2020 | Pieger | B33Y 50/00 |

FOREIGN PATENT DOCUMENTS

| | | |
|---|---|---|
| CN | 104272088 | 1/2015 |
| CN | 105745060 | 7/2016 |
| CN | 10647558 | 3/2017 |
| CN | 105748348 | 1/2018 |
| DE | 102014202020 | 8/2015 |
| KR | 10-2017-0099692 | 9/2017 |
| WO | WO 2011/153973 | 12/2011 |
| WO | 2017/008789 | 1/2017 |

OTHER PUBLICATIONS

International Search Report.
German Office Action.
Bendjus et al. P7.8-Laser-Speckle-Photometric-optische Sensorik zur Zustandsund Prozessuberwachung. 12. Dresdener Sensor Symposium, Dec. 9, 2015, p. 245 (including abstract).
Chinese Office Action.

\* cited by examiner

SYSTEM AND METHOD FOR MONITORING MANUFACTURING PRECISION IN THE ADDITIVE MANUFACTURING OF THREE-DIMENSIONAL COMPONENTS

BACKGROUND OF THE INVENTION

The invention relates to a system and a method for monitoring the manufacturing precision during the additive manufacturing of three-dimensional components.

Methods referred to as additive manufacturing, or else generative manufacturing, facilitate the time and resource-efficient production of components with virtually unlimited design and construction freedom. It is particularly valued and promoted on account of its advantages in functional manufacturing. Particularly in the field of manufacturing tool inserts, aerospace, medical engineering, and lightweight construction and generally in prototyping, it provides great innovation and application potential, for example when manufacturing custom-made implants or turbine blades that are cooled close to the contour.

Despite the continuous further development of the manufacturing processes and an increasing presence in the media, mainly characterized by the term "3D printing", there is still a great need for action in quality assurance and process stability. Incorrectly set process parameters or fluctuations in the process conditions can worsen the resulting mechanical-technological component properties or lead to process termination. Subsequent fault processing on the component is only possible in some cases and cancels out the advantage of additive manufacturing (AM). Thus, there is a clear need for solutions for plant-integrated process monitoring, which allow defects to be detected the moment these arise and allow the assembly of the component to be stopped in order to save material, but above all time and costs, which would arise in the case of further assembly and processing. Anomaly detection should also be possible in order to be able to control the manufacturing process and to carry out parametric closed-loop control without having to terminate the process.

Previous approaches to this end include melt pool monitoring, in which the construction process is monitored by thermography and image-based methods which are not suitable for controlling high-speed processes in very small spaces.

Against the background of the increasing demand for adequate solutions for the purpose of process monitoring and product documentation, various approaches have been followed in recent years. A system for monitoring the extent of the melt pool, similar to that already used in the field of laser welding, is thus known. Here, a beam splitter is used to capture the radiation emitted from the melt pool by means of a photodiode. The extent of the melt pool can be captured and subject to closed-loop control on the basis of the radiation intensity and the use of a further CMOS camera. A separately attached CCD camera is used to optically monitor the powder application. The images of the powder layer are used to detect wear and damage to the coating mechanism by way of possibly present stripe-shaped traces in the powder.

In an extended approach, additional lighting was integrated into the system in order also to be able to realize recordings with a high time resolution. The practice of representing the intensity of the melt pool radiation as a function of the laser beam position in the x- and y-coordinates by way of a mapping algorithm is also known in this respect. This procedure makes it possible to create a composite image of the melt pool temperature, which gives the impression of an image recording. Here, dark spots in the recordings are interpreted as a sign of a deviating process heat flow and can therefore signal local component excess height due to internal stresses and heat build-up in the case of overhang geometries.

The prior art has also disclosed the use of a bi-color pyrometer, which can likewise be coupled coaxially into the laser beam.

With the aid of thermography, the spatial and temporal development of the heat affected zone in the beam melting process can be recorded. Through the composition of the individual layer thermograms, a 3D report can be generated, which allows heat build-ups to be made visible on overhang geometries. However, the field of view is limited to an area measuring 160 mm×120 mm, which can only cover a small section of the construction field.

Attempts have also been made to use an imaging system for monitoring the powder application and the melted layer. To this end, high-resolution image recordings are automatically recorded during the construction process and documented in a container file format. Local component excess height can be detected in the recorded image data and can be used for assessing the process stability by way of image analysis processes.

SUMMARY OF THE INVENTION

It is therefore an object of the invention to specify options for online monitoring of the manufacturing precision during the additive manufacturing of three-dimensional components, which have simple and cost-effective embodiments and which allow monitoring to be carried out both with improved precision and in miniaturized fashion.

According to the invention, this object is achieved by a system having the features of the claims.

A combined illumination and detection element is present in the system according to the invention. The combined illumination and detection element is equipped with a two-dimensional detector array and at least one laser radiation source, by means of which electromagnetic radiation is directed onto a region of a powdery material or material present in pasty form, by means of which at least one region of a three-dimensional component is produced as a consequence of a locally defined energy influx.

The detector array is arranged and embodied in such a way that speckle occurring in/on the surface region irradiated by the laser radiation source is detectable in spatially resolved fashion.

The speckle signals captured with spatial resolution by the detector array are fed to an electronic evaluation circuit. The electronic evaluation circuit is connected to an electronic open-loop and closed-loop control device embodied to influence the manufacturing process.

Thermal speckle excitation is achieved using a separate energy beam or an energy beam used to introduce energy in locally defined fashion into the powdery material or material present in pasty form for three-dimensional additive manufacturing.

In the case of a detector array that can be used in the invention, the individual detectors or sensors should be arranged in a row and column arrangement for spatially resolved and simultaneous capture of speckle obtained by excitation with supplied energy. Here, it is possible to evaluate spatially resolved speckle which was captured at the same time and at subsequent times separated by specifiable time intervals. Use can be made of optical sensors that can capture the intensity of electromagnetic radiation impinging on the respective sensors. This may be the case for a single wavelength or a wavelength range of the electromagnetic radiation incident on an optical detector or sensor, or in wavelength-resolved (spectrally resolved) fashion. Desired monitoring of the manufacturing precision can be achieved using the measurement signals from the detectors or sensors, captured in spatially resolved fashion and, where applicable, advantageously in time-resolved fashion, too.

Thus, the principle of laser speckle photometry (LSP) can be applied within the scope of the invention.

LSP is suitable for real-time monitoring and has a high sensitivity for both out-of-plane and in-plane shifts. In contrast to the other techniques, which concentrate on the distortion of the entire speckle patterns or the interference patterns (fringes), LSP measures the spatio-temporal dynamics of the speckle caused by the change in the intensity of each individual pixel of the detector array.

A speckle pattern can form after a speckle excitation if a rough surface is illuminated by a coherent light source. The scattered waves from different points of the illuminated area interfere on the rough surface in an observation plane and generate the speckle pattern there as a spatial structure with randomly distributed intensity minima and maxima, which can be detected by a CCD/CMOS chip as a detector array. A speckle pattern carries fingerprint information about the 3D nature of the surface. As a rule, work is carried out in the near-field range in order to be able to derive this information about the scattering objects. The structure information can predominantly be taken from the order statistic of the speckle intensity and speckle phase or amplitude. In addition to the structure information, the speckle images captured in spatially resolved fashion by a detector array can deliver important information over time, e.g., about diffusion processes in examined objects. Similarly, it is possible on the basis of the movement of material captured in speckle images, the activity of which are ascertained by means of appropriate algorithms of the dynamically, temporally successively captured speckle images. By way of example, a certain correlation function (autocorrelation difference) can be used to ascertain the interaction between speckle dynamics and the state of the respective surface of a sample or during a process. The basic LSP algorithm is based on the calculation of the thermal diffusivity using the solution of the heat transfer equation.

The procedure is substantially more robust since only one beam path is used. The measurement structure is simple and hence efficiently miniaturizable. The system can be directly attached to a feed or a smoothing device for powdery material or material present in pasty form and can be moved with the feed or the smoothing device. As a result, it can also synchronously follow the advance movement during a material application or during smoothing of applied material and requires no dedicated drive to this end. Here, the system can be arranged in such a way that the capture of speckle signals at a layer previously processed with an energy beam for solidifying material leads to the detection being carried out simultaneously with the movement for material application or smoothing.

A feed for material can be a droplet application device, in particular a printing device, a device for laser cladding or a powder feed for an additive manufacturing process and the smoothing device can be a doctor blade.

A wide variety of metals with their alloys or ceramic materials can be used as materials for additive manufacturing. Components that are to be produced using at least two different materials can also be manufactured additively.

Advantageously, the two-dimensional detector array, the at least one laser radiation source and the electronic evaluation circuit and, optionally, further required elements, for example an electrical power supply unit and a reflecting element, can be arranged together on a circuit carrier. This can further improve the miniaturization. The circuit carrier can be multilayered. Electrically conductive connections can be formed by means of printed electrical conductor tracks and vias. Here, at least the at least one laser radiation source and the detector array should be arranged on the surface of the circuit carrier facing the component or the material from which the component should be produced.

A separate energy beam should be incident on a reflecting element and the energy beam reflected by the latter should preferably be incident on a region of the powdery material or material present in pasty form, said region not being irradiated by the laser radiation source and/or not being detected by the detector array. A separate energy beam can likewise be a laser beam.

As already indicated, the reflecting element should likewise be attached to the feed or the smoothing device for powdery material or material present in pasty form and should be able to be moved together with the feed or the smoothing device. What this can achieve is that a thermal excitation can be achieved without additional measures at a location that is expedient for the detection of the speckle signals.

In the invention, the laser radiation source could be a laser diode or laser diode array and/or the detector array could be a CCD or CMOS array.

An optical filter and/or an optical beam-shaping element, in particular an optical lens, can be arranged between the material and the laser radiation source and/or the detector array. Using an optical filter, bothersome components of the electromagnetic radiation, such as, e.g., reflected or scattered radiation, can be avoided, or at least suppressed, during detection and evaluation. Moreover, monochromatized electromagnetic radiation can be used better for irradiation if an optical filter is arranged upstream of the at least one laser radiation source. Using at least one optical element, the size and shape of the respectively irradiated and/or detected area can be influenced on applied or distributed material.

In the method, the procedure is such that the laser radiation source is used to direct electromagnetic radiation onto a region of a powdery material or material present in pasty form, by means of which at least one region of a three-dimensional component is manufactured additively as a consequence of a locally defined energy influx.

Here, the detector array is arranged and embodied in such a way that speckle occurring in the surface region irradiated by the laser radiation source is detected in spatially resolved fashion.

The speckle signals captured with spatial resolution by the detector array are fed to an electronic evaluation circuit. The electronic evaluation circuit is connected to an electronic open-loop and closed-loop control device embodied to influence the manufacturing process and the evaluated speckle signals are transmitted to the electronic open-loop and closed-loop control device.

Thermal speckle excitation is achieved using a separate energy beam or an energy beam used to introduce energy in locally defined fashion into the powdery material or material present in pasty form for three-dimensional additive manufacturing.

Using the electronic open-loop and closed-loop control device, the manufacturing process is terminated or, taking account of the captured and evaluated speckle signals, influenced following the evaluation in such a way that manufacturing faults, in particular errors during the application of the material, are compensated should a deviation be determined from speckle signals from a correctly applied material which were ascertained in advance.

This can avoid rejects with unnecessary consumption of material and energy.

An energy beam used for solidifying the applied material, in particular for sintering or fusing, can be an electron or laser beam, in particular. Such an energy beam can additionally also be exploited for a thermal excitation, which can be used to generate speckle. Here, a separate energy beam for this excitation may be dispensed with where applicable.

In contrast to the approaches specified above (thermography and melt pool monitoring), a miniaturized monitoring system based on the speckle sensor system is able to detect specific material parameters (for instance porosity, but potentially also further parameters) and surface-open defects during the additive 3D manufacturing process. Moreover, in comparison with previously known technical solutions, the individual components of a system according to the invention are able to be integrated in a very small space, facilitating, in particular, retrofitting of an already available apparatus for additive manufacturing. Constructing a sensor array from a plurality of miniaturized LSP sensor units can also be used for simultaneous mapping of material parameters.

This allows monitoring of manufacturing processes that are performed quickly.

DESCRIPTION OF THE DRAWINGS

The invention will be explained in greater detail by way of example below. The features shown in the figures and explained in the description thereof can be combined with one another, independently of the respective figure and the respective example.

In the figures.

DETAILED DESCRIPTION OF THE INVENTION

Figure 1:
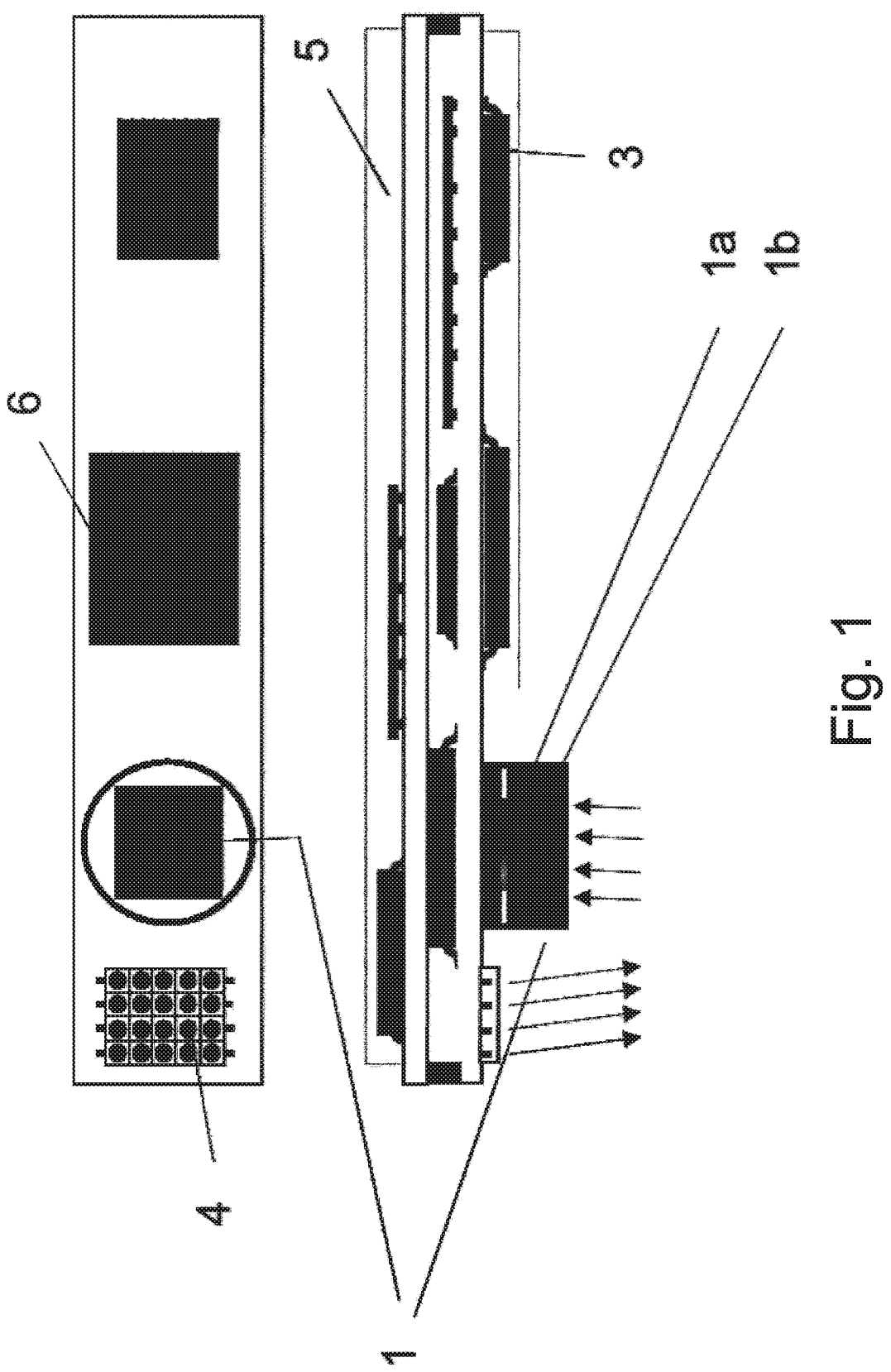
FIG. 1 shows two views of an example of a system according to the invention.

The innovative combined illumination and detection element 12 can be used for LSP. Here, in addition to a high-resolution image converter (CMOS/CCD) as a detector array 1, in combination with an optical filter 1a and an optical lens/objective lens 1b in this example, an energy efficient electronic evaluation and control circuit 3, for example a chipset/electronics unit for controlling the measuring regime and for image processing close to the detector and a laser diode array as a laser radiation source 4 for exciting speckle patterns, are attached to a circuit carrier 5, for example a printed circuit board. These elements can be interconnected by interference-free and low-current electrical interfaces by way of electrical conductor tracks printed on the circuit carrier 5 and vias, not illustrated here. An electrical power supply unit 6, which is flexibly adapted to the respective use location, can also be present on/at the circuit carrier 5.

A multi-layer or multi-ply structure of a circuit carrier 5 is identifiable particularly in the lower lateral sectional illustration through this example.

The size of the individual components, in particular those of the detector array 1 and of the laser diode array as a laser radiation source 4, can advantageously be used in the case of a multi-layer circuit carrier 5 with optimized line/space conditions and miniaturized bores. Here, the structure can be expanded as desired in the z-axis direction. Thus, use can be made of thicker circuit carriers 5 or circuit carriers 5 with more than two layers.

Figure 2:
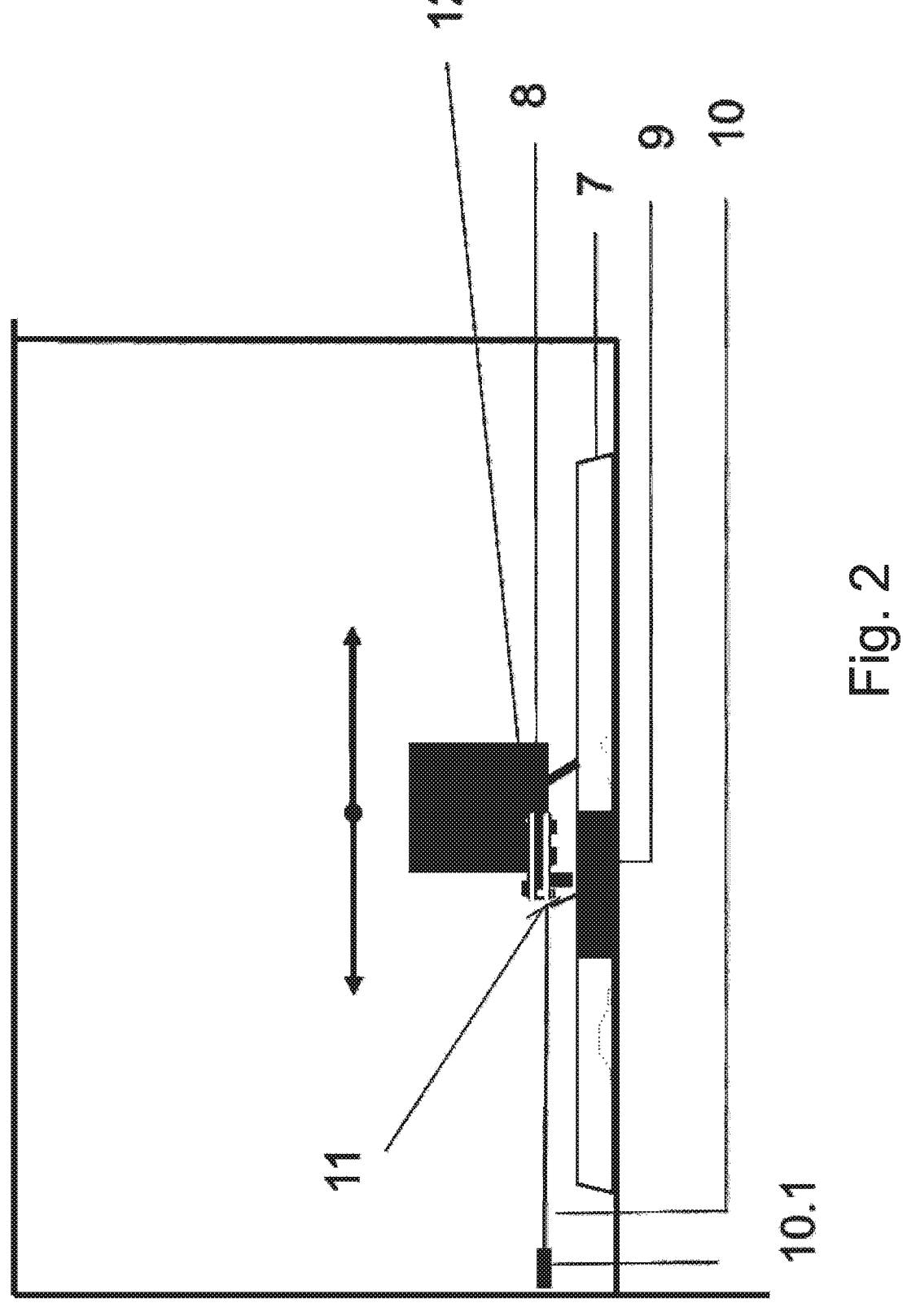
FIG. 2 shows an example of a system according to the invention used on an apparatus embodied for selective laser sintering or selective laser melting.

The combined illumination and detection element 12 is fastened to the machine unit which is embodied to apply and smooth a powdery material 7 that is applied layer-by-layer onto a powder bed and that is processed by an energy beam. This can be carried out on a doctor blade 8, which is used for smoothing and maintaining a certain layer thickness of the powdery material 7 This is shown in FIG. 2. The doctor blade 8 is moved to form a layer of a powder bed, in order to uniformly distribute the powdery material 7, i.e., in particular distribute said material homogeneously with a constant layer thickness over the entire layer area.

Using the combined illumination and detection element 12, each layer of a component 9 to be manufactured additively can be measured at a point or line-by-line during the production thereof. Here, for example, it is possible to detect a non-uniform distribution of the powdery material 7 in a layer, particles present in the respective layer whose particle size deviates from specifications or impurities, and then take these into account accordingly.

However, it is also possible to use the combined illumination and detection element 12 and possibly other components belonging to a system, either after or during the processing of a respective layer made of powdery material 7 with an energy beam for solidifying the respective material 7, to carry out a detection by means of LSP and, in the process, also identify faults that have occurred during the additive manufacturing when forming at least one layer. If faults are identified, an electronic open-loop and closed-loop control device, not shown, which is embodied to influence the manufacturing process, can be used to intervene in the manufacturing process, as has been explained in the general part of the description.

In this example, thermal excitation is carried out with a separate energy beam 10, which is emitted by a photodiode/laser diode 10.1 and directed onto an element 11 that reflects the energy beam 10. Here, the energy beam 10 and the reflecting element 11 are arranged and aligned with respect to one another in such a way that the focus of the energy beam 10 impinges on the surface of the powdery material 7 and brings about thermal excitation. Here, the focus should be directed onto a position that is not located directly in the detection region that can be captured by the detector array 1.

Figure 3:
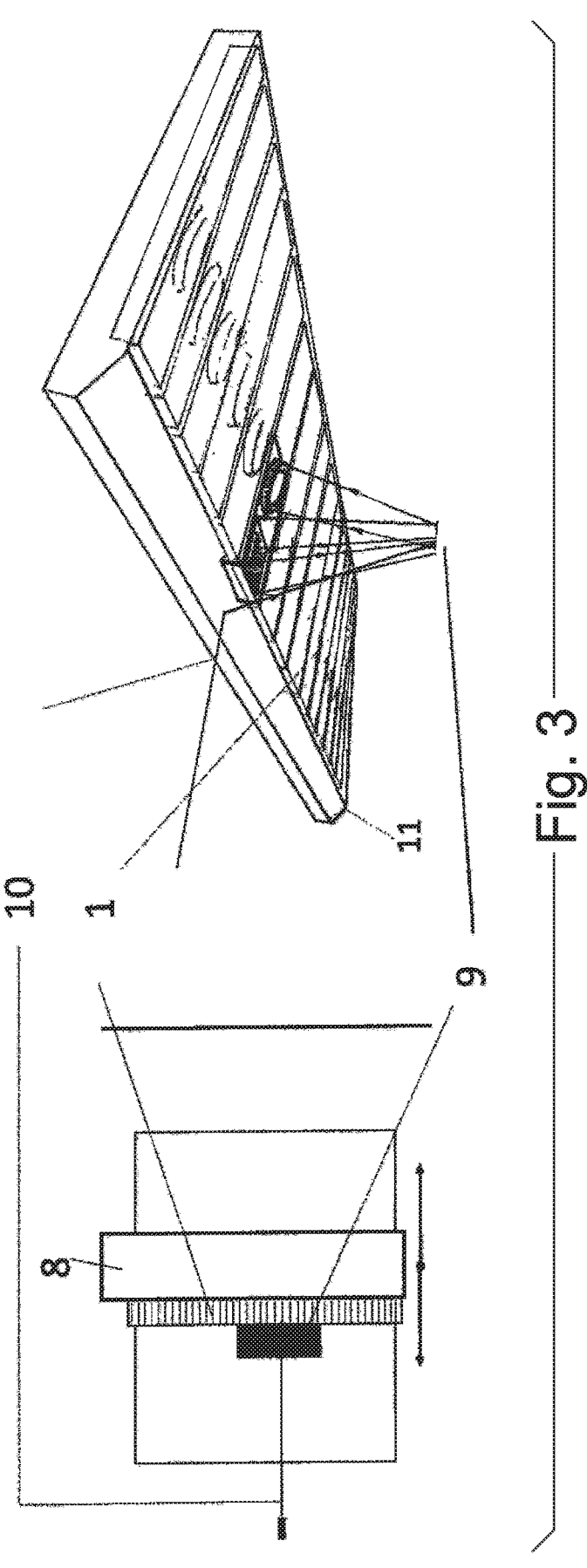
FIG. 3 shows two illustrations in different views of an example.

The left-hand illustration of FIG. 3 schematically shows how, for the purposes of exciting speckle, a laser beam 10 is directed onto a surface of a component 9 to be manufactured additively. Here, a detector array 1 is arranged on a doctor blade 8 and moved with the latter. The doctor blade 8 is used to bring about a layer-by-layer powder distribution, as is conventional in selective laser welding or laser sintering.

The right-hand illustration makes it clear that the detector array 1 is formed with a plurality of optical sensors, which are arranged in a row and column arrangement. Present on the detector array 1 is a reflecting element 11, by means of which the laser beam 10, for the purposes of exciting speckle, is directed onto the surface of the uppermost layer of the powder bed used to additively manufacture the component 9.

The optical sensors capture, in spatially resolved fashion, the speckle excited by the laser beam 10.

The invention claimed is:

1. A method for monitoring the manufacturing precision during the additive manufacturing of three-dimensional components using a system of elements, the method consisting of the following sequential steps:

providing combined illumination and detection elements having a two-dimensional detector array and at least one laser radiation source to direct electromagnetic radiation onto a region of a powdery material or material present in pasty form, wherein at least one region of the three-dimensional component is produced as a consequence of a locally defined energy influx;

arranging the two-dimensional detector array so that speckle occurring in/on a respective surface being irradiated by the at least one laser radiation source is detectable in spatially resolved fashion;

feeding speckle signals captured in spatially resolved fashion by the two-dimensional detector array to an electronic evaluation and control circuit which is connected to an electronic open-loop and closed-loop control device to influence the system of elements;

using a separate energy beam to exclusively generate thermal speckle excitation incident on a region of the powdery material or the material present in pasty form, which has not be irradiated by the at least one laser radiation source and/or has not been detected by the two-dimensional detector array;

directly attaching the system of elements to a feed or a smoothing device for the powdery material or the material present in pasty form and being movable with the feed or the smoothing device;

directing the at least one laser radiation source electromagnetic radiation onto a region of the powdery material or the material present in pasty form, so that at least one region of the three-dimensional component is produced as a consequence of the locally defined energy influx, and arranging the two-dimensional detector array in such a way that the speckle signals occurring on the respective surface irradiated by the laser radiation source are detected in a temporally and spatially resolved fashion to detect a state of the respective surface;

feeding the speckle signals captured in spatially resolved fashion over time by the detector array to the electronic evaluation and the control circuit;

evaluating the speckle signals by the electronic evaluation and the control circuit and directing them to the electronic open-loop and the closed-loop control device to influence the system of elements;

solely achieving thermal speckle excitation by using the separate energy beam incident on the region of the powdery material or the material present in pasty form, which has not been irradiated by the laser radiation source and/or has not been detected by the detector array;

using the electronic open-loop and the closed-loop control device, to terminate the system taking account of the captured and evaluated speckle signals, subsequently influenced in such a way that errors during the application of the powdery material or the material present in pasty form, are immediately compensated for when a deviation is determined compared to speckle signals on a correctly applied powdery material or material in pasty form which were ascertained in advance.

2. The method according to claim 1, wherein the system of elements is used whereby the two-dimensional detector array, the at least one laser radiation source and the electronic evaluation and the control circuit are arranged together on one circuit carrier.

3. The method according to claim 1, wherein the separate energy beam is incident on a reflecting element and the separate energy beam reflected by the reflecting element is incident on a region of the powdery material or the material present in pasty form, the region not being irradiated by the laser radiation source and/or not being detected by the two-dimensional detector array.

4. The method according to claim 1, wherein a reflecting element attached to the feed or the smoothing device for the powdery material or the material present in pasty form is movable with the feed or the smoothing device.

5. The method according to claim 1, wherein a laser diode or laser diode array is used as the at least one laser radiation source and/or a CCD or CMOS array is used as the two-dimensional array.

6. The method according to claim 1, wherein the feed of the powdery material is carried out with a droplet application device, selected from the group consisting of a printing device, a device for laser cladding or a powder feed for an additive manufacturing process, and the smoothing device is a doctor blade.

7. The method according to claim 1, wherein reflected or scattered radiation will be avoided, or at least suppressed, during detection and evaluation by arranging an optical fiber and/or an optical beam-shaping element between the powdery material or the material present in pasty form and the at least one laser radiation source and/or the two-dimensional detector array.

* * * * *